Feb. 12, 1963  E. ENK ETAL  3,077,384
PROCESS FOR MANUFACTURING INDIUM PHOSPHIDE
AND GALLIUM ARSENIDE OF HIGH PURITY
Filed April 18, 1961
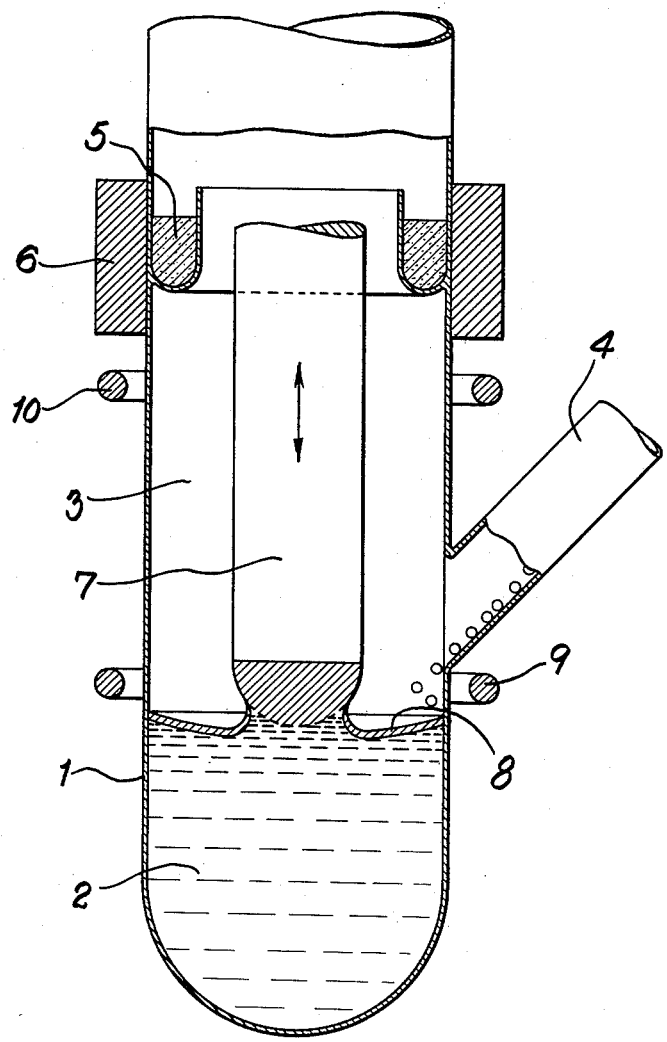
INVENTORS
EDUARD ENK
HERBERT JACOB
BY JULIUS NICKL
D Malcolm
ATTORNEY 3,077,384
Patented Feb. 12, 1963

3,077,384
PROCESS FOR MANUFACTURING INDIUM PHOSPHIDE AND GALLIUM ARSENIDE OF HIGH PURITY
Eduard Enk, Herbert Jacob, and Julius Nickl, all of Burghausen, Upper Bavaria, Germany, assignors to Wacker-Chemie G.m.b.H., Munich, Germany, a corporation of Germany
Filed Apr. 18, 1961, Ser. No. 103,833
Claims priority, application Germany May 10, 1960
3 Claims. (Cl. 23—204)

This invention relates to the production of high purity chemical compounds, and it has for its object to provide a novel and improved process for this purpose.

Another object of the invention is to produce high purity compounds of molten and gaseous reaction partners in a container which may be composed of conventional crucible materials, without contaminating said compounds with any impurities present in such materials.

Still another object is to facilitate the reaction of molten and gaseous substances by a novel combination of process steps including the maintaining of a temperature gradient in the body of the non-volatile reactant.

Various other objects and advantages will be apparent as the nature of the invention is more fully disclosed.

It is known to manufacture high purity compounds with semi-conductor properties by melting one of the components in a vessel and adding the other component to the melt in the form of a gas or vapor. In such processes the melt always touches the sides of the vessel. Since the purity of the sides of the vessel determines the kind and quantity of impurities in the melt produced, the use of those processes where the melt touches the sides of the vessel is limited by the purity of the vessel materials.

Another drawback of such prior art processes lies in the limitation of the external form of the compound made, which is dictated by the form of the vessel. For instance, cylindrical rods can be made only when tubular vessels are used. But this has the disadvantage that the melt necessarily contacts comparatively large surface areas of the vessel material and takes up impurities from the latter.

The semi-conductor arts, the optical industry and many other branches of industry are looking principally for II/VI—, III/V— or IV/IV— compounds with extremely low percentages of impurities. The majority of these compounds have a volatile component, especially the nitrides, phosphides, arsenides, selenides and sulfides; i.e. under the conditions of the formation of the compound, one of the components exhibits a greater volatility than the other. For instance, the vapor pressure of arsenic during the formation of gallium arsenide from gallium and arsenic is about 1 atmosphere, while the gallium pressure is not measurable.

We have now discovered a process for manufacturing high purity bodies by chemical reaction of molten and gaseous reaction partners in accordance with the crucible melting process. Our process is characterized by the fact that the solid reaction product which has formed on the surface of the melt, and the still unconverted liquid material, are drawn off upwardly by means of one or more solid bodies composed of the same end material or of an inert material, then melted down once more with subsequent reaction, and then these are left to harden.

The essential feature of our process is that we start with a solid seed or nucleus. This seed may be of the same material as the compound to be produced, or of some other different material. If it is polycrystalline, it is preferable for manufacturing polycrystalline bodies, if its structure is monocrystalline, it is possible to build up monocrystalline bodies.

The process can be varied and adapted in different ways. Thus the process is not only suitable for making components with semi-conductor properties. It can also be used for making compounds with other dominant properties, such as mechanical, magnetic, optical, catalytic, or thermal properties. In particular, the process permits the making of I/VII—, II/VI— and III/V— compounds, and also of nitrides, phosphides, arsenides, antimonides, oxides, sulfides, selenides, tellurides, halides, borides, carbides, silicides, germanides, stannides, intermetallic compounds and their mixtures. However, the process is not limited to the compounds named. In general it permits the making of shaped bodies from molten and gaseous materials.

As volatile starting products we can use elements and/or inorganic and/or organic compounds of the 5th, 6th and 7th main groups of the periodic system singly or in mixtures. For instance by setting a defined arsenic pressure one can evaporate the arsenic, or arsenic hydride can be used instead of arsenic. But other compounds which can be transformed into a gaseous state with comparative ease, and which react with the melt, can also be used. These starting materials can also be used in finely dispersed form, for instance as aerosol.

As non-volatile starting substances we can use elements, alloys, stoichiometric and non-stoichiometric inorganic or organic compounds, intermetallic compounds, solid solutions singly or in mixtures. The non-volatile part of the melt can be introduced in a liquid or solid state. During discontinuous introduction it is possible to form regions with different compositions. This can also be achieved by introducing the volatile starting substances into the melt at different pressures or different flow speeds or concentrations.

The direct heating of the melting zone, whose temperature can be even higher than the melting point of the reaction product, is done advantageously by electric high frequency. However, heating is also possible by means of passage of electric current, radiant or convection heat, bombardment with electrons, or a combination of the various heating methods mentioned. When the condensation temperature of the volatile component is higher than the room temperature, it is often necessary also to heat the walls of the vessel and to keep them at a temperature which is different from that of the melt. Suitable for heating the walls of the vessel are radiant or convected heat, coiled heating wire or other conductor coverings, for instance semi-conducting oxide and metal films.

The process is preferably carried out in such a way that a temperature gradient is maintained inside the molten non-volatile material, in which the surface of the melt has the highest temperature. But one can also use advantageously the method of melting only the surface of the non-volatile starting substance, while the balance is not subjected to so much heat and therefore is not melted.

The volatile component can be introduced into the melting zone as a flowing, or as a stationary, gaseous phase. In working with the flowing method it may be useful to use an inert gas as a carrier. For instance, this process can be used for manufacturing compounds which are not compounded stoichiometrically.

The non-volatile components can be introduced into the smelting zone from above, from the sides or from below in a solid state or as granules, rods or wires or in liquid form by means of gravity, centrifugal force, magnetic and/or electric forces.

Suitable materials for the reaction vessel are quartz glass, graphite, silicon carbide, tantalum, titanium; and suitable packing or luting agents are the same compounds as those manufactured, or the elements to be processed, for instance gallium is a suitable sealing or luting agent in the manufacture of gallium arsenide.

The invention is described more in detail in connection with the accompanying drawing which is a diagrammatic illustration of an apparatus suitable for carrying out the process.

The drawing shows a reaction vessel 1 the bottom portion of which contains the non-gaseous reaction partner, for example the melt 2 of indium. The said indium, in solid or liquid state, is introduced from the side of vessel 1 through pipe 4.

Above the melt 2, in gas zone or chamber 3, an atmosphere of phosphorus is maintained, phosphorus in this instance being the reaction partner which is gaseous at the reaction temperature. The phosphorus, in this case all of it at once, is placed in the pocket 5, and it is kept at a constant temperature by means of a suitable temperature control device 6 so that a definite phosphorus vapor pressure is maintained in the gas zone or chamber 3.

A vertically movable rod 7, in this instance preferably composed of indium phosphide, is immersed from above into the melt 2 in vessel 1, and this rod 7 attracts and withdraws the indium phosphide portions which have formed on the surface 8 of the melt. As the rod 7 is raised it also draws up molten indium, and the heat, furnished by a suitable heating device 9, causes the surrounding phosphorus vapor to react with this elevated indium and convert it into indium phosphide. In this way the indium 2, supplied to the vessel 1 through pipe 4, is continuously transformed into indium phosphide of a high degree of purity.

In the same manner other elements can be converted into extremely pure compounds, for instance into nitrides, arsenides, oxides, sulfides, selenides, tellurides and halides. If the material on the end of the ascending rod 7 is not entirely converted in the lower gas zone 3, said material may be melted down again as by heat supplied by a suitable heating device 10, but in such case a solid stick will remain in the core of the formed rod. In this way it is possible to convert material, such as indium which has gotten outside the melt without being completely transformed, entirely into indium phosphide. Additional heating devices can be connected to the heating device 10 if necessary or desirable. After the conversion the formed compound is left hanging to harden.

The invention claimed is:

1. Process for manufacturing a binary compound selected from the group consisting of indium phosphide and gallium arsenide, of high purity, which comprises forming a melt of an element, selected from the group consisting of indium and gallium, in a container at the temperature of reaction at which the binary compound is formed, vaporizing phosphorus where the binary compound being formed is indium phosphide and a substance selected from the group consisting of arsenic and arsenic hydride where the compound being formed is gallium arsenide, at the temperature of reaction in said container, above and in contact with the surface of the melt, dipping a solid body into said melt and then raising said solid body above the surface of said melt and out of contact with said container to draw up from said melt the reaction product formed on the surface of said melt and portions of still unconverted elements, and continuing to heat to the temperature of reaction, the reaction mixture raised by said solid body to complete the reaction.

2. Process for manufacturing indium phosphide of high purity, which comprises forming a melt of indium in a container at the temperature of reaction at which the phosphide is formed, vaporizing phosphorus at the temperature of reaction in said container, above and in contact with the surface of the indium melt, dipping a solid body into said melt and then raising said solid body above the surface of said melt and out of contact with said container to draw up the reaction product formed on the surface of said melt and portions of still unconverted indium from said melt, and continuing to heat to the temperature of reaction the reaction mixture raised by said solid body to complete the reaction.

3. Process for manufacturing gallium arsenide of high purity, which comprises forming a melt of gallium in a container at the temperature of reaction at which the arsenide is formed, vaporizing a substance selected from the group consisting of arsenic and arsenic hydride at the temperature of reaction in said container, above and in contact with the surface of the gallium melt, dipping a solid body into said melt and then raising said solid body above the surface of said melt and out of contact with said container to draw up the reaction product formed on the surface of said melt and portions of still unconverted gallium from said melt, and continuing to heat to the temperature of reaction the reaction mixture raised by said solid body to complete the reaction.

References Cited in the file of this patent

UNITED STATES PATENTS 2,871,100     Guire et al. _____ Jan. 27, 1959

OTHER REFERENCES

Hannay Book, "Semiconductors," 1959 ed., pages 111–113. Reinhold Publishing Corp., N.Y.

Lange's Handbook of Chemistry, 1944 ed., pages 54 and 55. Handbook Publishers, Inc., Sandusky, Ohio.